United States Patent
Peri et al.

(10) Patent No.: US 12,546,497 B1
(45) Date of Patent: Feb. 10, 2026

(54) SYSTEMS AND METHOD OF IDENTIFYING HEAT/COOL INGRESS WITH A CLIMATE CONTROL SYSTEM

(71) Applicant: Trane International Inc., Davidson, NC (US)

(72) Inventors: Gautam Peri, Visakhapatnam (IN); Aditya Shrivastava, Bangalore (IN); Arulkumar Kaliyaperumal, Mayiladuthurai (IN); Shriraj Nair, Bangalore (IN); Suresh Nukala, Bangalore (IN); Wilson Samuel Jesudason Lawrence, Bangalore (IN)

(73) Assignee: TRANE INTERNATIONAL INC., Davidson, NC (US)

( * ) Notice: Subject to any disclaimer, the term of this patent is extended or adjusted under 35 U.S.C. 154(b) by 518 days.

(21) Appl. No.: 18/066,657

(22) Filed: Dec. 15, 2022

(51) Int. Cl.
*F24F 11/63* (2018.01)

(52) U.S. Cl.
CPC ..................... *F24F 11/63* (2018.01)

(58) Field of Classification Search
CPC ......... F24F 11/63; F24F 11/64; F25B 49/022; Y02B 30/70
See application file for complete search history.

(56) References Cited

U.S. PATENT DOCUMENTS

| | | |
|---|---|---|
| 4,316,256 A | 2/1982 | Hendricks et al. |
| 4,446,913 A | 5/1984 | Krocker |
| 5,555,927 A * | 9/1996 | Shah .................. G05D 23/1904 165/239 |
| 9,157,646 B2 | 10/2015 | Anderson et al. |
| 9,816,719 B2 | 11/2017 | Bergman et al. |
| 9,870,009 B2 | 1/2018 | Erwin et al. |

(Continued)

FOREIGN PATENT DOCUMENTS

| | | |
|---|---|---|
| CA | 2138114 A1 | 7/1995 |
| CA | 2373311 C | 7/2010 |
| CA | 2873592 A1 | 11/2013 |

OTHER PUBLICATIONS

Kline, Individual room hvac temperature set point device, 1999, Full Document (Year: 1999).

*Primary Examiner* — Alicia M. Choi
(74) *Attorney, Agent, or Firm* — Womble Bond Dickinson (US) LLP

(57) ABSTRACT

A system and method of identifying heat/cool ingress with a climate control system. In one embodiment the method includes receiving first and second indoor temperature values that represent ambient temperature of a first climate-controlled space of a building at different times and receiving an outdoor temperature value that represents ambient temperature of an environment external to the building. A first temperature gradient value is calculated based on the first and second indoor temperature values. A first expected temperature gradient value is selected from a plurality of expected temperature gradient values stored in memory using the outdoor temperature value. A difference is determined between the first temperature gradient value and the first expected temperature gradient value. A first signal is generated if the difference between the first temperature gradient value and the first expected temperature gradient value exceeds a predetermined threshold value.

20 Claims, 8 Drawing Sheets

(56) References Cited

U.S. PATENT DOCUMENTS

| | | |
|---|---|---|
| 10,496,057 B2 | 12/2019 | Hrejsa |
| 10,592,821 B2 | 3/2020 | Denton et al. |
| 10,971,253 B2 | 4/2021 | Gould |
| 11,333,384 B1* | 5/2022 | Karimi ................. G05B 13/048 |
| 2005/0189429 A1 | 9/2005 | Breeden |
| 2011/0153090 A1* | 6/2011 | Besore ................... G05B 15/02 |
| | | 700/278 |
| 2013/0261808 A1* | 10/2013 | Besore ..................... F24F 11/62 |
| | | 700/278 |
| 2013/0338836 A1 | 12/2013 | Vaughn et al. |
| 2014/0039689 A1 | 2/2014 | Honda et al. |
| 2014/0123685 A1 | 5/2014 | Kim et al. |
| 2016/0054019 A1* | 2/2016 | Lee .......................... F24F 11/88 |
| | | 700/276 |
| 2016/0153674 A1* | 6/2016 | Lancaster ................ F24F 11/58 |
| | | 700/276 |
| 2017/0030598 A1 | 2/2017 | Burns et al. |
| 2018/0066854 A1* | 3/2018 | Gagne ....................... F24H 8/00 |
| 2019/0162436 A1 | 5/2019 | Albinger et al. |
| 2020/0141597 A1* | 5/2020 | Amundson .............. F24F 11/80 |
| 2021/0148595 A1 | 5/2021 | Heintzelman et al. |
| 2021/0310685 A1 | 10/2021 | Kanematsu et al. |
| 2022/0082323 A1 | 3/2022 | Poulsen |
| 2022/0390138 A1 | 12/2022 | Jaber et al. |
| 2023/0020824 A1* | 1/2023 | Gupta ................ G05D 23/1932 |

\* cited by examiner

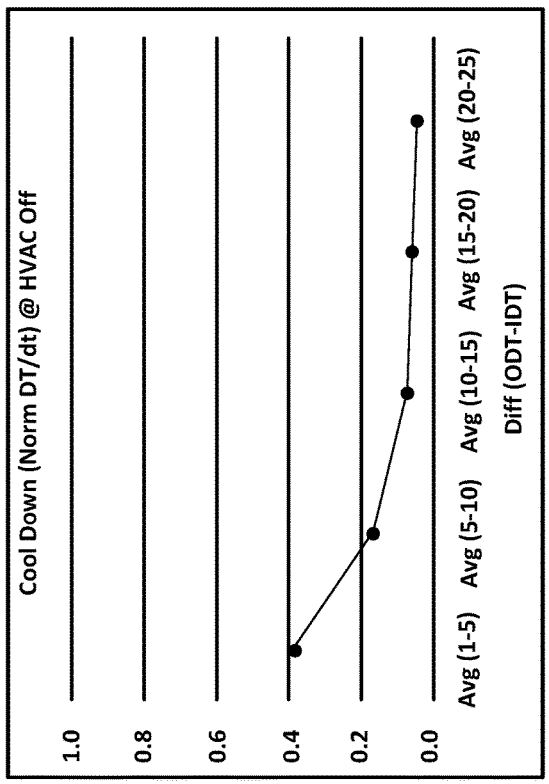
Fig. 5A
Fig. 5B
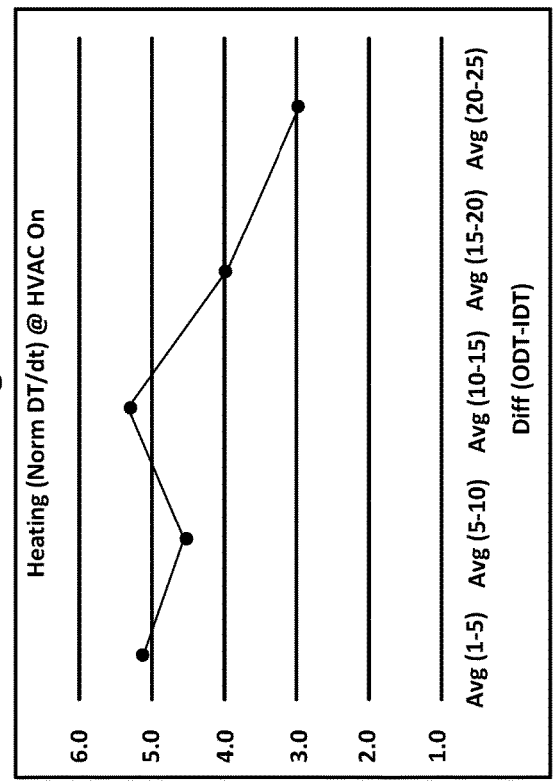
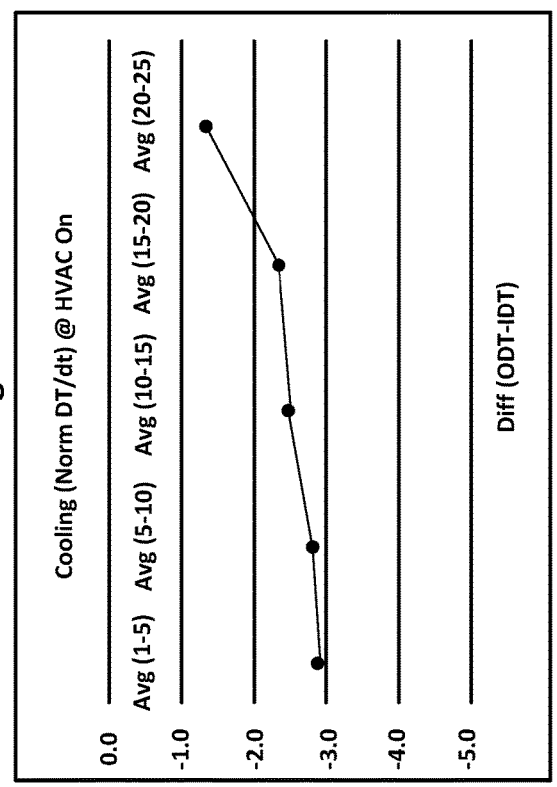
Fig. 5C
Fig. 5D

130

SYSTEMS AND METHOD OF IDENTIFYING HEAT/COOL INGRESS WITH A CLIMATE CONTROL SYSTEM

TECHNOLOGICAL FIELD

The present disclosure relates to a method and apparatus for monitoring a climate-controlled space in general, and a method and apparatus for detecting an unexpected increase or decrease of temperature within the climate-controlled space.

BACKGROUND

Climate control systems (e.g., heating, ventilation, and air conditioning (HVAC) systems) are efficient at heating or cooling spaces in buildings such as single-family houses. However, spaces in buildings are often heated or cooled by sources other than an HVAC system, such as a window left open on a hot summer day or a cold winter night. Building owners often face increased bills for gas or electricity when this happens.

BRIEF SUMMARY

The following presents a summary to provide a basic understanding of one or more embodiments of the disclosure. This summary is not intended to identify key or critical elements or delineate any scope of the embodiments or any scope of the claims. Its sole purpose is to present concepts in a simplified form as a prelude to the more detailed description that is presented later.

According to an embodiment of the present disclosure, a method includes the acts of receiving first and second indoor temperature values that represent ambient temperature of a first climate-controlled space of a building at different times and receiving an outdoor temperature value that represents ambient temperature of an environment external to the building. A first temperature gradient value is calculated based on the first and second indoor temperature values. A first expected temperature gradient value is selected from a plurality of expected temperature gradient values stored in memory using the outdoor temperature value. A difference is determined between the first temperature gradient value and the first expected temperature gradient value. A first signal is generated if the difference between the first temperature gradient value and the first expected temperature gradient value exceeds a predetermined threshold value.

According to an embodiment of the present disclosure, an apparatus includes a memory comprising instructions and a central processing unit configured to implement a method in response to executing the instructions, the method including the acts of receiving first and second indoor temperature values that represent ambient temperature at different times of a first climate-controlled space of a building, and receiving an outdoor temperature value that represents ambient temperature of an environment external to the building. A first temperature gradient value is calculated based on the first and second indoor temperature values. A first expected temperature gradient value is selected from a plurality of expected temperature gradient values stored in memory using the outdoor temperature value. A difference is determined between the first temperature gradient value and the first expected temperature gradient value. A first signal is generated if the difference between the first temperature gradient value and the first expected temperature gradient value exceeds a predetermined threshold value.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE DRAWINGS

For a detailed description of various exemplary embodiments, reference will now be made to the accompanying drawings in which:

FIG. 5a illustrate examples of expected temperature gradients when the HVAC system of FIG. 1 is in cooling mode, and off.

FIG. 5b illustrate examples of expected temperature gradients when the HVAC system of FIG. 1 is in cooling mode, and on.

FIG. 5c illustrate examples of expected temperature gradients when the HVAC system of FIG. 1 is in heating mode, and off.

FIG. 5d illustrate examples of expected temperature gradients when the HVAC system of FIG. 1 is in heating mode, and on.

The use of the same reference symbols in different figures indicates similar or identical items.

DETAILED DESCRIPTION

Figure 1:
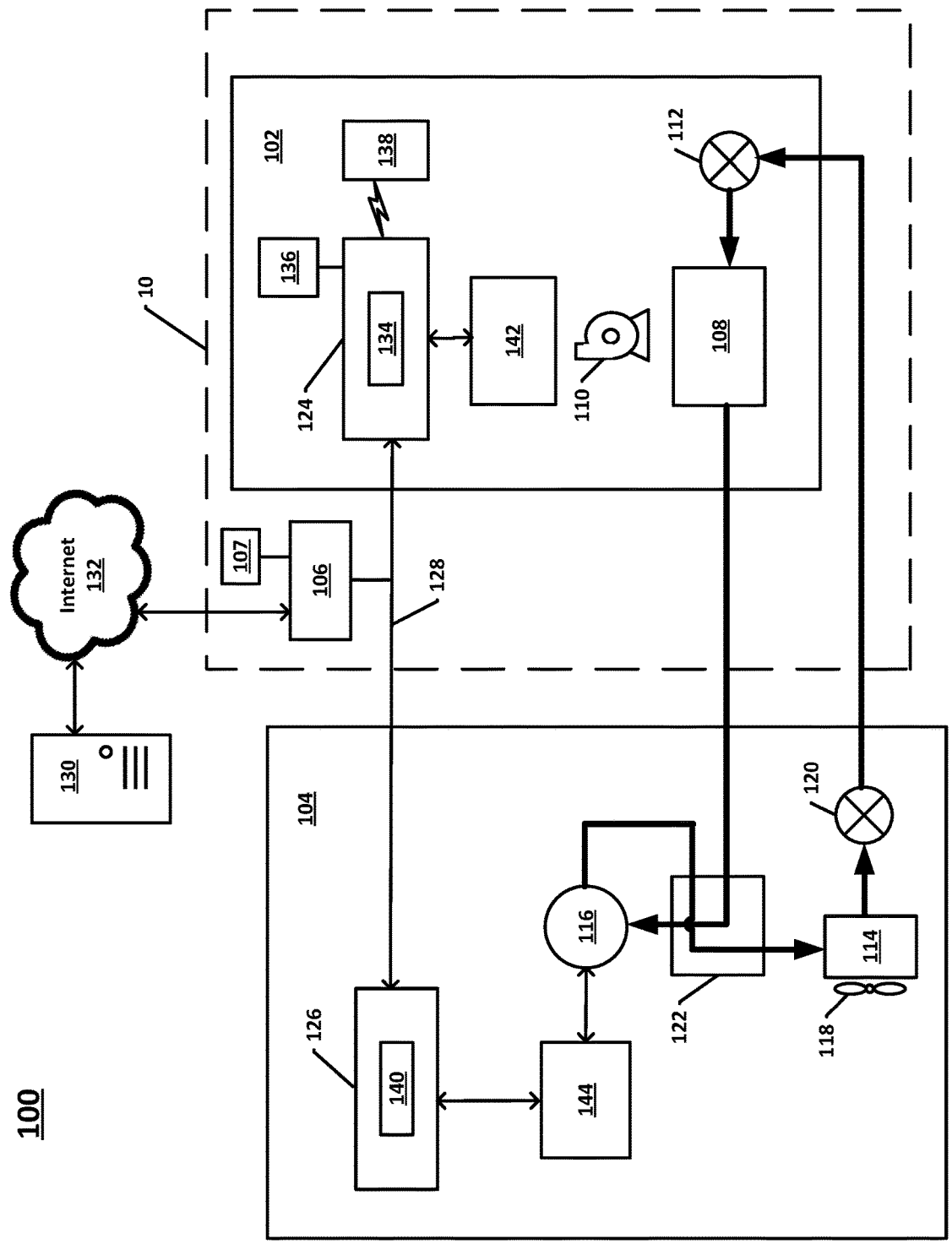
FIG. 1 is a schematic diagram that illustrates an example HVAC system.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple," "coupled" or "couples" is intended to mean either an indirect or direct connection. Thus, if a first device couples to a second device, that connection may be through a direct connection of the two devices, or through an indirect connection that is established via other devices, components, nodes, and connections. Further, when used herein (including in the claims), the words "about," "generally," "substantially," "approximately," and the like mean within a range of plus or minus 10% unless otherwise stated herein.

Modern HVAC systems are efficient at maintaining the temperatures of spaces in buildings. The indoor temperature of a space should change at a predictable rate when the HVAC turns on and provides cooling or when warming air to the space, or when the HVAC turns off. However, if there is an unexpected heating or cooling source (e.g., an open door or window on a hot summer day or cold winter night), the temperature of the space may increase or decrease at a rate that is greater or lower than what is expected.

The present disclosure provides a method and apparatus for monitoring the temperature of a climate-controlled space in a building. If the temperature in the space changes at an abnormal rate, the method or apparatus can generate a warning or message indicating that a source other than or in addition to the HVAC system may be unexpectedly heating or cooling the space. The present disclosure will be made with respect to monitoring the temperature of a climate-controlled space of a single-family house, it being understood the present disclosure can find application for monitoring spaces in other types of buildings.

FIG. 1 is a schematic diagram that illustrates an example HVAC system 100 for heating or cooling an interior space 10 of a single-family house. HVAC system 100 includes a heat pump system that may selectively operate to implement one or more substantially closed thermodynamic refrigeration cycles to provide a cooling functionality (hereinafter "cooling mode") and/or a heating functionality (hereinafter "heating mode") for indoor space 10. In other embodiments, the HVAC system 100 may be configured as an air conditioner that does not provide a heating mode via a refrigeration cycle. In yet other embodiments, the HVAC system could be, or include, a heating system such as a furnace, electric heater, or radiator.

The HVAC system 100, configured as a heat pump system, generally includes an indoor unit 102, an outdoor unit 104, and a system controller 106 that may generally control operation of the indoor unit 102 and/or the outdoor unit 104. In some embodiments, the indoor unit 102 and the outdoor unit 104 may be located within the same housing, often exterior to the interior space 10. Systems where the indoor unit 102 and the outdoor unit 104 are housed together are often referred to as packaged units. For purposes of explanation only, the system controller 106 and its input/output (I/O) unit 107 form a thermostat that is located within space 10.

Indoor unit 102 generally includes an indoor air handling unit having an indoor heat exchanger 108, an indoor fan 110, an indoor metering device 112, and an indoor controller 124. In some embodiments, one or more of the components of indoor unit 102 may be disposed within the indoor space 10; however, it should be appreciated that some or all the components of indoor unit 102 may be disposed outside of indoor space 10. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may include a plate-fin heat exchanger. However, in other embodiments, indoor heat exchanger 108 may include a microchannel heat exchanger and/or any other suitable type of heat exchanger.

The indoor fan 110 may include a centrifugal blower having a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of the indoor space. The indoor fan 110 may alternatively include a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally include an electronically-controlled motor-driven electronic expansion valve (EEV). In some embodiments, however, the indoor metering device 112 may include a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also include and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally includes an outdoor heat exchanger 114, a compressor 116, an outdoor fan 118, an outdoor metering device 120, a reversing valve 122, and an outdoor controller 126. In some embodiments, one or more of the components of outdoor unit 104 may be disposed outside of the indoor space 10; however, it should be appreciated that one or more of the components of outdoor unit 104 may be disposed within the indoor space 10. In some embodiments, the outdoor unit 104 may also include a plurality of temperature sensors for measuring the temperature of the outdoor heat exchanger 114, the compressor 116, and/or the ambient outdoor temperature ODT. The outdoor heat exchanger 114 may generally be configured to promote heat transfer between a refrigerant carried within internal passages or tubing of the outdoor heat exchanger 114 and an airflow that contacts the outdoor heat exchanger 114 but that is segregated from the refrigerant. In some embodiments, outdoor heat exchanger 114 may include a plate-fin heat exchanger. However, in other embodiments, outdoor heat exchanger 114 may include a spine-fin heat exchanger, a microchannel heat exchanger, or any other suitable type of heat exchanger.

The compressor 116 may generally include a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may include a rotary-type compressor configured to selectively pump refrigerant at a plurality of mass flow rates. In some embodiments, however, the compressor 116 may include a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally include an axial fan including a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may include a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may include a mixed-flow fan, a centrifugal blower, and/or any other suitable type of fan and/or blower.

The outdoor metering device 120 may generally include a thermostatic expansion valve. In some embodiments, however, the outdoor metering device 120 may include an electronically-controlled, motor-driven, EEV like indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also include and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally include a four-way reversing valve. The reversing valve 122 may also include an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the HVAC system 100. The system controller 106 may be configured to control operation of the indoor unit 102 and/or the outdoor unit 104. The system controller 106 may be configured to monitor and/or communicate, directly or indirectly, with a plurality of sensors associated with components of the indoor unit 102, the outdoor unit 104, or other devices. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature ODT. Additionally, in some embodiments, the system controller 106 may be configured to control heating and/or cooling of zones associated with the HVAC system 100 (e.g., within the indoor space).

The system controller 106 may also be in communication with or incorporated with an input/output (I/O) unit 107 (e.g., a graphical user interface, a touchscreen interface, or the like) for displaying information and for receiving user inputs. The I/O unit 107 may display information related to the operation of the HVAC system 100 (e.g., from system controller 106) and may receive user inputs related to operation of the HVAC system 100. During operation, I/O unit 107 may communicate received user inputs to the system controller 106, which may then execute control of HVAC system 100 accordingly. Communication between the I/O unit 107 and system controller 106 may be wired, wireless, or a combination thereof. In some embodiments, the I/O unit 107 may further be operable to display information and receive user inputs (e.g., heating, and cooling setpoint temperatures HSP and CSP) tangentially and/or unrelated to operation of the HVAC system 100. In some embodiments, however, the I/O unit 107 may not include a display and may derive all information from inputs from remote sensors and remote configuration tools (e.g., remote computers, servers, smartphones, tablets, etc.). In some embodiments, system controller 106 may receive user inputs from remote configuration tools and may further communicate information relating to HVAC system 100 to I/O unit 107. In these embodiments, system controller 106 may or may not also receive user inputs via I/O unit 107. For purposes of explanation only, the system controller 106 and/or the I/O unit 107 is embodied in a thermostat (e.g., thermostat 150 discussed below) that is disposed within indoor space 10. As will be described in more detail below, such a thermostat (not specifically shown in FIG. 1 or 2) may include one or more onboard temperature sensors for determining the ambient temperature of indoor space 10.

System controller 106 may be configured for selective bidirectional communication over a communication bus 128. In some embodiments, portions of the communication bus 128 may include a three-wire connection suitable for communicating messages between the system controller 106 and one or more of the HVAC system 100 components configured for interfacing with the communication bus 128. The system controller 106 may be configured to selectively communicate with HVAC system 100 components. The system controller 106 may also be configured to selectively communicate with a device (e.g., a server computer system) 130 via a communication network 132 such as the Internet. Device 130 may implement one or more embodiments for monitoring the temperature of space 10 in accordance with the present disclosure as more fully described below.

Indoor controller 124 may generally be configured to receive information inputs, transmit information outputs, and/or otherwise communicate with the system controller 106, the outdoor controller 126, and/or device 130 via the communication bus 128 and/or any other suitable medium of communication. In some embodiments, the indoor controller 124 may be configured to communicate with an indoor personality module 134 that may include information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may include information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may include information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

System controller 106, indoor controller 124, and outdoor controller 126 (as well as compressor drive controller 144, indoor fan controller 142, indoor EEV controller 138, I/O unit 107, etc.) may each include any suitable device or assembly, which can receive electrical (or other data) signals and transmitting electrical (or other data) signals to other devices. While not specifically shown, system controller 106, indoor controller 124, and outdoor controller 126 (as well as controllers 138, 142, 144, I/O unit 107, etc.) may each include a processor and a memory. The processors (e.g., microprocessor, central processing unit, or collection of such processor devices, etc.) may execute machine-readable instructions provided on the corresponding memory (e.g., non-transitory machine-readable medium) to provide the processor with all the functionality described herein. The memory of each controller 106, 124, 126 (as well as controllers 138, 142, 144, I/O unit 107, etc.) may include volatile storage (e.g., random access memory), non-volatile storage (e.g., flash storage, read only memory, etc.), or combinations of both volatile and non-volatile storage. Data consumed or produced by the machine-readable instructions can also be stored on the memory of controllers 106, 124, 126 (as well as controllers 138, 142, 144, I/O unit 107, etc.).

As shown in FIG. 1, the HVAC system 100 is configured for operating in cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again.

Figure 2:
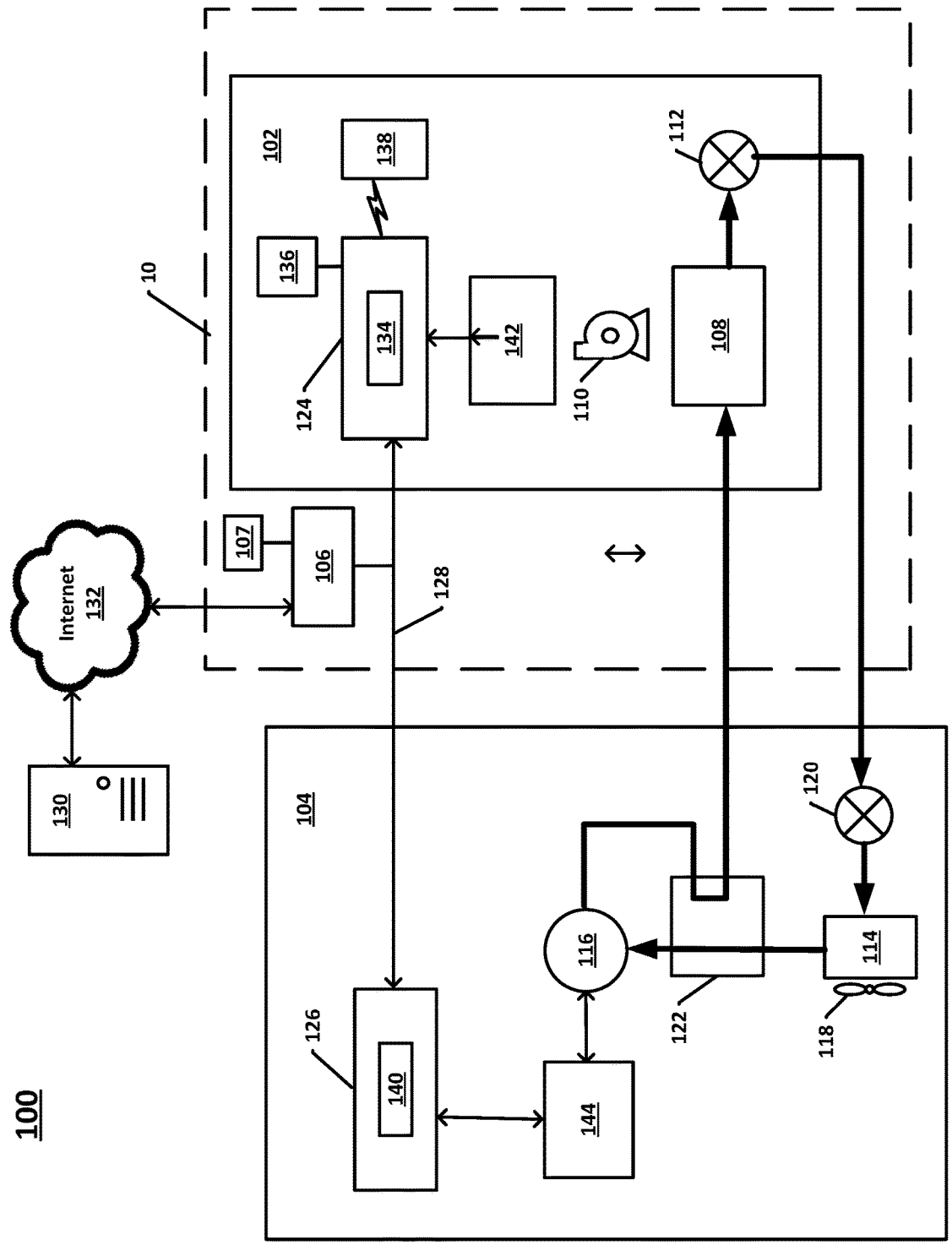
FIG. 2 shows the HVAC system of FIG. 1 operating in heating mode.

Reference is now made to FIG. 2, which shows the HVAC system 100 configured for operating in heating mode. Most generally, the roles of the indoor heat exchanger 108 and the outdoor heat exchanger 114 are reversed as compared to their operation in the above-described cooling mode. For example, the reversing valve 122 may be controlled to alter the flow path of the refrigerant from the compressor 116 to the indoor heat exchanger 108 first and then to the outdoor heat exchanger 114, the outdoor metering device 120 may be enabled, and the indoor metering device 112 may be disabled and/or bypassed. In heating mode, heat may generally be absorbed by refrigerant at the outdoor heat exchanger 114 and rejected by the refrigerant at the indoor heat exchanger 108. As the refrigerant is passed through the outdoor heat exchanger 114, the outdoor fan 118 may be operated to move air into contact with the outdoor heat exchanger 114, thereby transferring heat to the refrigerant from the air surrounding the outdoor heat exchanger 114. Additionally, as refrigerant is passed through the indoor heat exchanger 108, the indoor fan 110 may be operated to move air into contact with the indoor heat exchanger 108, thereby transferring heat from the refrigerant to the air surrounding the indoor heat exchanger 108.

Figure 3:
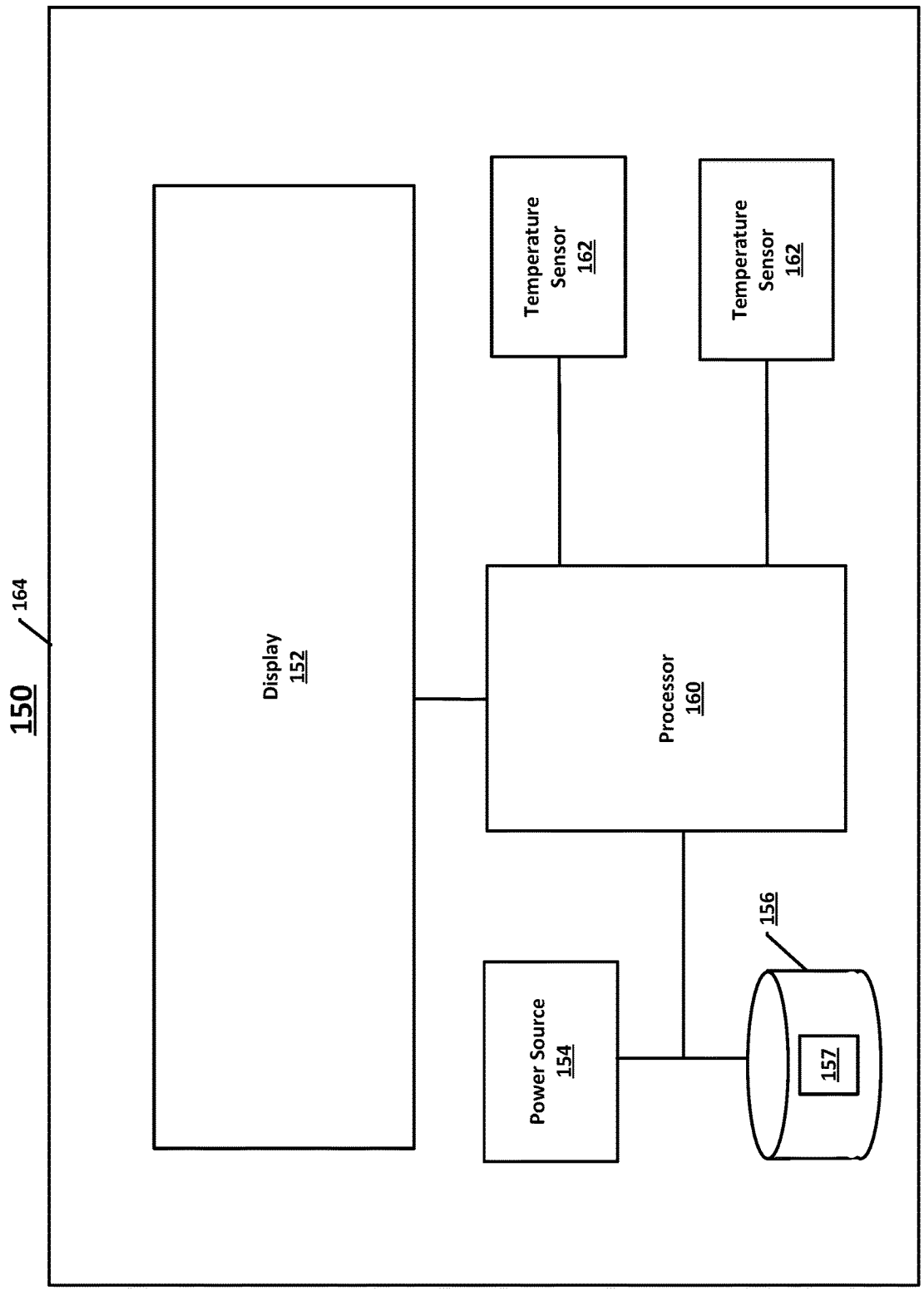
FIG. 3 illustrates an example thermostat that may be utilized within the HVAC system of FIG. 1.

Referring now to FIG. 3, a thermostat 150 is shown that may be utilized within HVAC system 100 (see e.g., FIG. 1). As previously described above, thermostat 150 embodies the system controller 106 and I/O unit 107. Thermostat 150 may include a display 152, a processor 160, a memory 156, a power source 154, and a plurality of onboard temperature sensors 162.

Display 152 may be an electronic display that is configured to project or display images generated by signals from an associated electronic device (e.g., processor 160). Display 152 may include any suitable display (or combination thereof), such as, for example, a liquid crystal display (LCD), an organic light emitting diode (OLED) display, an electrophoretic display, a plasma display, etc. In some embodiments, display 152 is a touch sensitive display. In some embodiments, thermostat 150 may not include a display 152.

The processor 160 (e.g., microprocessor, central processing unit, or collection of such processor devices, etc.) executes machine-readable instructions 157 (e.g., non-transitory machine-readable medium) provided on memory 156 that may provide processor 160 with functionality described herein (or some portion thereof). The memory 156 may include volatile storage (e.g., random access memory), non-volatile storage (e.g., flash storage, read only memory, etc.), or combinations of both volatile and non-volatile storage. Data consumed or produced by the machine-readable instructions 157 can also be stored on memory 156.

Power source 154 provides electrical power to other electronic components within thermostat 150 (e.g., processor 160, memory 156, temperature sensors 162, display 152, etc.). Power source 154 may comprise any suitable source of electrical power such as, for example, a battery, capacitor, a converter or transformer, etc. In addition, in some examples, thermostat 150 may also receive electrical power from wires or other conductors coupled to an electrical power supply for the indoor space (e.g., indoor space 10). Therefore, in some examples, power source 154 is not included in thermostat 150, and all electrical power is supplied to thermostat 150 from the electrical power supply for the indoor space.

Temperature sensors 162 may each comprise any suitable device or collection of devices for measuring ambient temperature of an environment adjacent to each temperature sensor 162. For instance, temperature sensors 162 may comprise thermos-couples, thermistors, infrared sensors, etc. More specifically, because the thermostat 150 is disposed within indoor space 10, the temperature sensors 162 may be configured to detect the ambient temperature of the indoor space 10, specifically the portion of the indoor space that immediately surrounds the thermostat 150 (as well as within the thermostat 150 itself). In some embodiments, thermostat 150 may include two temperature sensors 162; however, in other embodiments, thermostat 150 may include more than two temperature sensors 162, such as, for instance, three temperature sensors 162, four temperature sensors 162, five temperature sensors 162, and so on.

The rate at which the ambient temperature of indoor space 10 increases or decreases can be affected by windows or doors that are inadvertently left open during a hot summer day or a cold winter night, or by other sources heating (e.g., a fireplace left on or an oven door accidentally left open) or cooling. The present disclosure is directed to a method and apparatus for detecting an abnormal increase or decrease in the rate at which the temperature of a space changes. When an abnormal increase or decrease is detected, a message (e.g., a text message) could be sent, which suggests the space 10 is being heated or cooled by a source other than or in addition to HVAC system 100. In addition, the apparatus and method can send a message, which deactivates or activates a motor or other device, which in turn interrupts a suspected source of unwanted heating or cooling. The present disclosure contemplates other messages that can be sent in response to detection of an abnormal rate-of-change in temperature of a climate-controlled space. The abnormal rate-of-change may be due to an unwanted source of heating such as a window inadvertently left open during a hot summer day, which causes the temperature of the climate-controlled space to decrease more slowly when the HVAC system 100 is trying to cool the space, or which causes the temperature of the climate-controlled space to increase more rapidly when the HVAC system 100 is off. Also, the abnormal rate-of-change may be due to a wanted source of cooling such as a window purposely left open during a cool summer night, which aid the HVAC system 100 to cool the space more rapidly.

Figure 4:
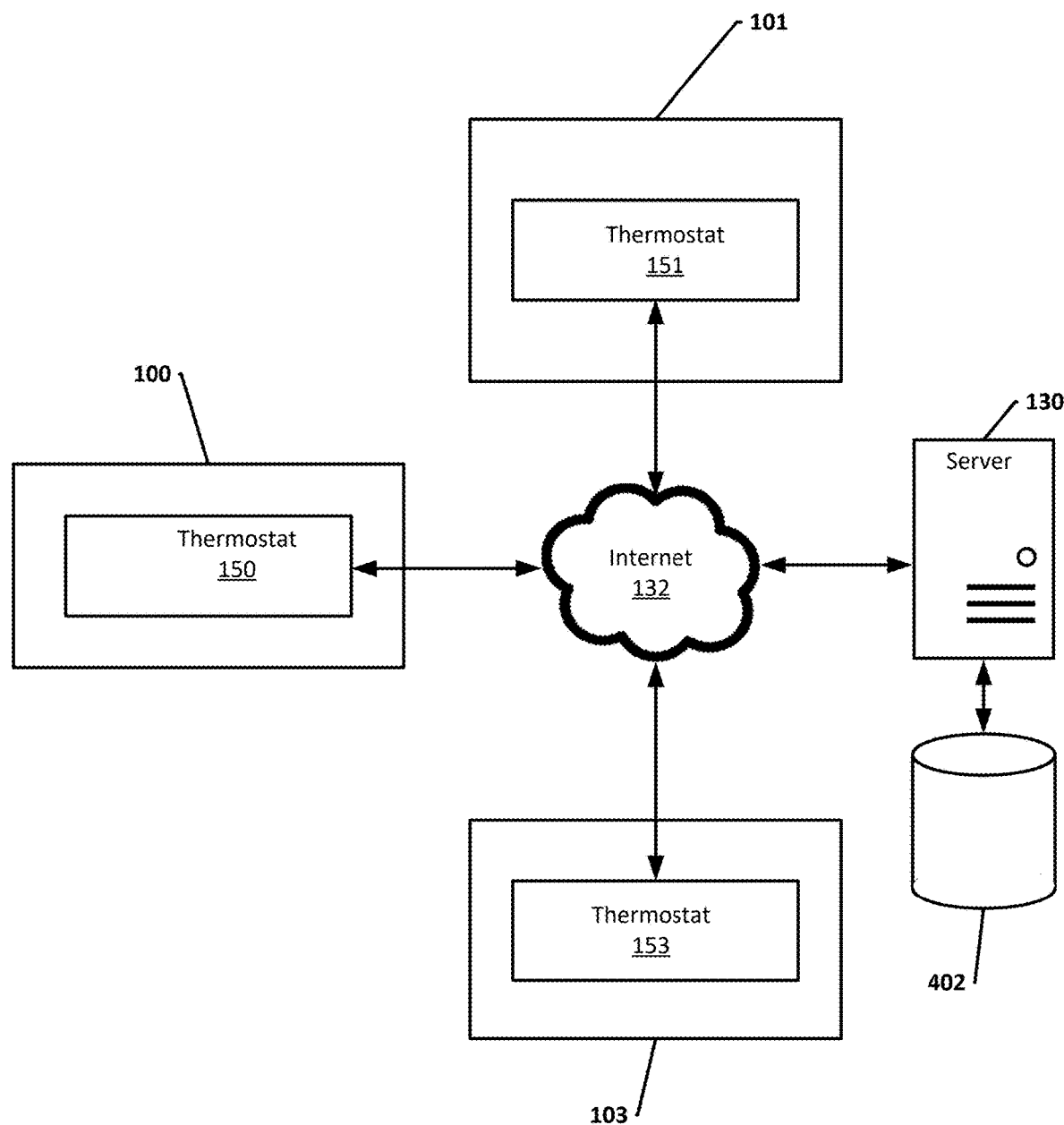
FIG. 4 is a block diagram of an example server in data communication with thermostats.

The method and apparatus of the present disclosure can be implemented locally as part of HVAC system 100. For example, the method can be implemented by processor 160 of thermostat 150. The method and apparatus can be implemented remotely in an alternative embodiment. For example, the method can be implemented on a server computer system (server). For purposes of explanation only, the present disclosure will be described with reference to remote implementation of the method on a server in Internet communication with thermostats, including thermostat 150. FIG. 4 is a block diagram of an example server 130 in data communication with thermostats 150-153 via Internet 132. Thermostats 151 and 153 are presumed to be like thermostat 150 and part of HVAC systems 101 and 103, respectively, that control indoor spaces of respective houses. Although not shown in FIG. 4, server 130 includes one or more processors configured to execute instructions stored in memory. Server 130 is configured to implement the present disclosure in response to executing instructions stored in the memory. Server 130 is in data communication with database 402, which stores respective sets of expected indoor temperature gradients (i.e., expected indoor temperature rate-of-change values $\Delta IDT/dt$ for given operating conditions) for respective indoor spaces. Houses that contain respective indoor spaces 10-13 may be located near each other in the same city or located in respective cities of non-adjacent states.

Server 130 can receive one or more messages (e.g., data packets) from thermostats 150-153 or other components (e.g., blowers or compressors) of HVAC systems 100-103 on a scheduled basis. For example, server 130 may receive one or more messages every five minutes from each of the thermostats 150-153. A message received by server 130 may include information needed by server 130 to detect an abnormality in the rate at which a corresponding indoor temperature increases or decreases. A message may include an indoor temperature IDT that represents an ambient temperature of space controlled by the thermostat. A message may include a timestamp identifying the date and time when the message was sent by the thermostat. A message may include a cooling setpoint temperature CSP or heating setpoint temperature HSP. Each message may include a cooling threshold temperature CTT at which the HVAC system automatically activates to cool the space, or a heating temperature threshold HTT at which the HVAC system automatically activates to heat the space. A message may also include one or more status indicators of an HVAC system associated by the thermostat. For example, each message may include a status indicator that indicates whether the HVAC system is in heating or cooling mode. Another status indicator may indicate the operational status of the HVAC (i.e., whether it is on or activated and cooling or heating the space, or whether the HVAC is off or deactivated). Another status indicator may indicate whether a motor (e.g., a compressor motor, a blower motor) is on or off. A message may include an outdoor temperature ODT that represents the temperature of the ambient air outside the house of the space being monitored. Each message may include several or all the information stated above.

As noted, database 402 is in data communication with server 130. Database 402 stores unique sets of expected temperature gradients (i.e., rate-of-change values $\Delta IDT/dt$) associated with each of the thermostats 150-153. Each expected temperature gradient is normalized as will be more fully described below. The expected temperature gradients are calculated by server 130 based upon historical data provided by respective thermostats 150-153, and each expected temperature gradient defines a rate at which indoor temperature IDT should change depending on, for example, time of day, day of year, IDT, ODT, HSP, CSP, CTT, HTT, HVAC mode (i.e., cooling mode or heating mode), and/or HVAC operational status (i.e., on or off) contained in one or more messages received from the thermostats.

FIGS. 5a-5d graphically illustrate example sets of expected temperature gradient values that were calculated for thermostat 150 based on data provided by thermostat 150 at different times of day, days of year, IDTs, ODTs, HSPs, CSPs, CTTs, HTTs, HVAC modes (i.e., cooling mode or heating mode), and/or HVAC operational status (i.e., on or off). The expected temperature gradient values of FIGS. 5a-5d are unique to thermostat 150, and should be used to monitor only space 10 in which thermostat 150 is contained. The present disclosure will be described with reference to server 130 monitoring space 10 via thermostat 150 using expected temperature gradient values that were specifically calculated for thermostat 150, it being understood that server 130 can monitor spaces 11 and 13 via thermostats 151 and 153, respectively, using expected temperature gradient values that were similarly calculated for those thermostats.

With continuing reference to FIGS. 5a-5d, the x-axis in each represents "bins." Each bin is a range of differences between outdoor temperature ODT and indoor temperature IDT. For example, bin1 represents a difference of 1° F. to 5° F. between indoor temperature IDT and outdoor temperature ODT, bin2 represents a difference of 5° F. to 10° C. between indoor temperature IDT and outdoor temperature ODT, etc. The y-axis represents normalized, expected indoor temperature gradients $\Delta IDT/dt$ for the bins. FIG. 5a shows that a normalized, expected indoor temperature gradient $\Delta IDT/dt$ of approximately 0.3 is expected when the difference between indoor temperature and the outdoor temperature is around 2.5° F. for the climate-controlled space of house 100 being monitored.

FIG. 5a represents normalized, expected indoor temperature gradients $\Delta IDT/dt$ when the HVAC system 100 is in cooling mode, and off. FIG. 5b represents normalized, expected indoor temperature gradients $\Delta IDT/dt$ when the HVAC system 100 is in cooling mode, and on and cooling space 10. FIG. 5c represents normalized, expected indoor temperature gradients $\Delta IDT/dt$ when the HVAC system 100 is in heating mode, and off. FIG. 5d represents normalized, expected indoor temperature gradients $\Delta IDT/dt$ when the HVAC system 100 is in heating mode, and on and heating space 10. An expected temperature gradient $\Delta IDT/dt$ can be normalized in one of many ways. The expected temperature gradients $\Delta IDT/dt$ represented in FIGS. 5a and 5b can be normalized by dividing $\Delta IDT/dt$ by a difference between indoor and outdoor temperatures (e.g., ODT-IDT). The expected temperature gradients $\Delta IDT/dt$ represented in FIG. 5c can be normalized by dividing $\Delta IDT/dt$ by a difference between indoor temperature and the cooling setpoint (e.g., IDT-CSP). The expected temperature gradients $\Delta IDT/dt$ represented in FIG. 5d can be normalized by dividing $\Delta IDT/dt$ by a difference between indoor temperature and the heating setpoint (e.g., HSP-IDT).

Server 130 accesses database 402 and retrieves expected gradient values for climate-controlled space 10 based upon current operating information of HVAC system 100, such as indoor temperatures IDTs, outdoor temperatures ODTs, setpoint HSP or CSP, HVAC mode, etc., contained within one or more messages transmitted by thermostat 150 as will be more fully described below. For example, server 130 may use the mode (heating or cooling) and operational status (active or inactive) of HVAC system 100, which is contained in a received message, to select the appropriate set of normalized, expected gradients represented by FIGS. 5a-5d. Server 130 may also use the indoor temperature IDT and outdoor temperature ODT of the message to select the appropriate normalized, expected temperature gradient in the selected set of expected gradients. Server 130 uses the selected, normalized, expected gradient values to detect sources other than or in addition to the HVAC system 100 that may be heating or cooling space 10.

Figure 6:
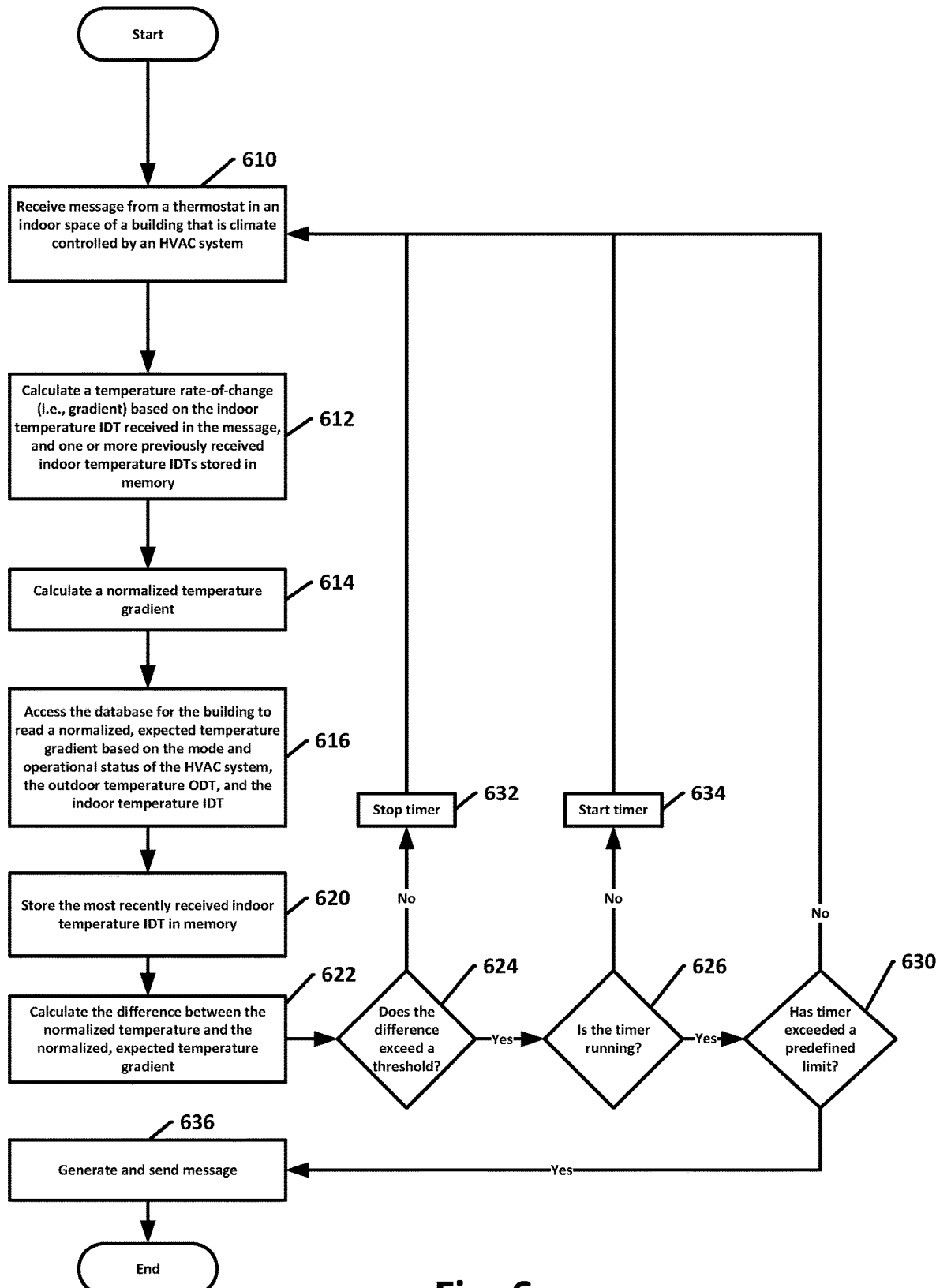
FIG. 6 is a flowchart that illustrates relevant aspects of a method according to one embodiment the present disclosure.

FIG. 6 is a flowchart that illustrates relevant aspects of an example method implemented by server 130 for generating a message when an unexpected source of heating or cooling is detected according to one embodiment the present disclosure. FIG. 6 will be described with reference to a method of detecting an abnormal temperature gradient in space 10, it being understood the method can apply equally with respect to detecting an abnormal temperature gradient in spaces 11 and 13. With continuing reference to FIGS. 1 and 4, in step 610 server 130 receives a message from thermostat 150 that includes indoor temperature IDT of space 10, outdoor temperature ODT, HVAC system 100 mode (heating or cooling), time stamp, HVAC system 100 operational status (on or off), setpoint temperature HSP or CSP. The information received in step 612 may be received from thermostat 150 in separate messages in an alternative embodiment.

Server 130 includes a memory that stores previously received indoor temperature IDTs and corresponding time stamps from thermostat 150. In step 612 server calculates a temperature gradient for space 10 based on the indoor temperature IDT received in the message and one or more previously received indoor temperatures IDTs, which are stored in memory. In step 614 server 130 calculates a normalized temperature gradient based upon the temperature gradient calculated in step 612. In one embodiment, the normalized temperature gradient is calculated by dividing the temperature gradient calculated in step 612 by the difference between the indoor temperature IDT and the outdoor temperature ODT received in the message of step 610, assuming the HVAC operational status of the message is set to off. Otherwise, the normalized temperature gradient is calculated by dividing the temperature gradient calculated in step 612 by the difference between the indoor temperature IDT, and the heating setpoint HSP or cooling setpoint CSP, depending on whether HVAC system 100 is operating in heating or cooling mode. In step 616 server 130 accesses database 402 to retrieve a normalized, expected temperature gradient from one of the sets of normalized, expected gradients that were previously calculated. More specifically, server 130 retrieves the expected, normalized temperature from database 402, which is mapped to the HVAC operational status (on or off), HVAC mode (heat or cool), and the difference between the indoor and outdoor temperatures IDT and ODT. In step 620, server 130 stores the indoor temperature IDT received in step 610 in memory. Thereafter in step 622 server 130 calculates the difference between the normalized temperature gradient calculated in step 614 and the normalized, expected temperature gradient retrieved from database 402 in step 616. If the difference exceeds a threshold (e.g., zero), the climate-controlled space 10 is being heated or cooled by a source (e.g., an open window) other than or in addition to HVAC system 100. Server 130 checks the difference in step 624. A timer may or may not be running at step 624. If the difference calculated in step 622 does not exceed the threshold, then server 130 stops the timer as shown in step 632, if the timer was running. Then the process repeats with step 610. If the difference calculated in step 622 does exceed the threshold, the server 130 checks to see whether the timer is running in step 626. If the timer is not running, server 130 starts the timer as shown in step 634 and the process repeats with step 610. If the timer is determined to be running in step 626, server 130 compares the timer with an expected limit (e.g., two hours) in step 630. If server 130 determines that the timer does not exceed a predefined limit, then the process repeats with step 610. However, if the timer value exceeds the predefined limit in step 630, then climate-controlled space 10 is presumed to be heated or cooled by a source other than or in addition to the HVAC system, and server 130 generates and sends a message in step 636 to a device associated with HVAC system 100. For example, server 130 can send an automated text message to a predesignated smart phone indicating that space 10, should be checked for a source that is providing unexpected heating or cooling. Alternatively, server 130 can send a similar message for display on the interface of thermostat 150. In still another embodiment, server 130 can send a command to a motor controller to activate a motor associated with space 10. The activated motor may, for example, draw down a window shade to block sunlight that passes through a window of space 10. In step 630 if the timer has not exceeded the predefined limits, step 610 is repeated.

Figure 7:
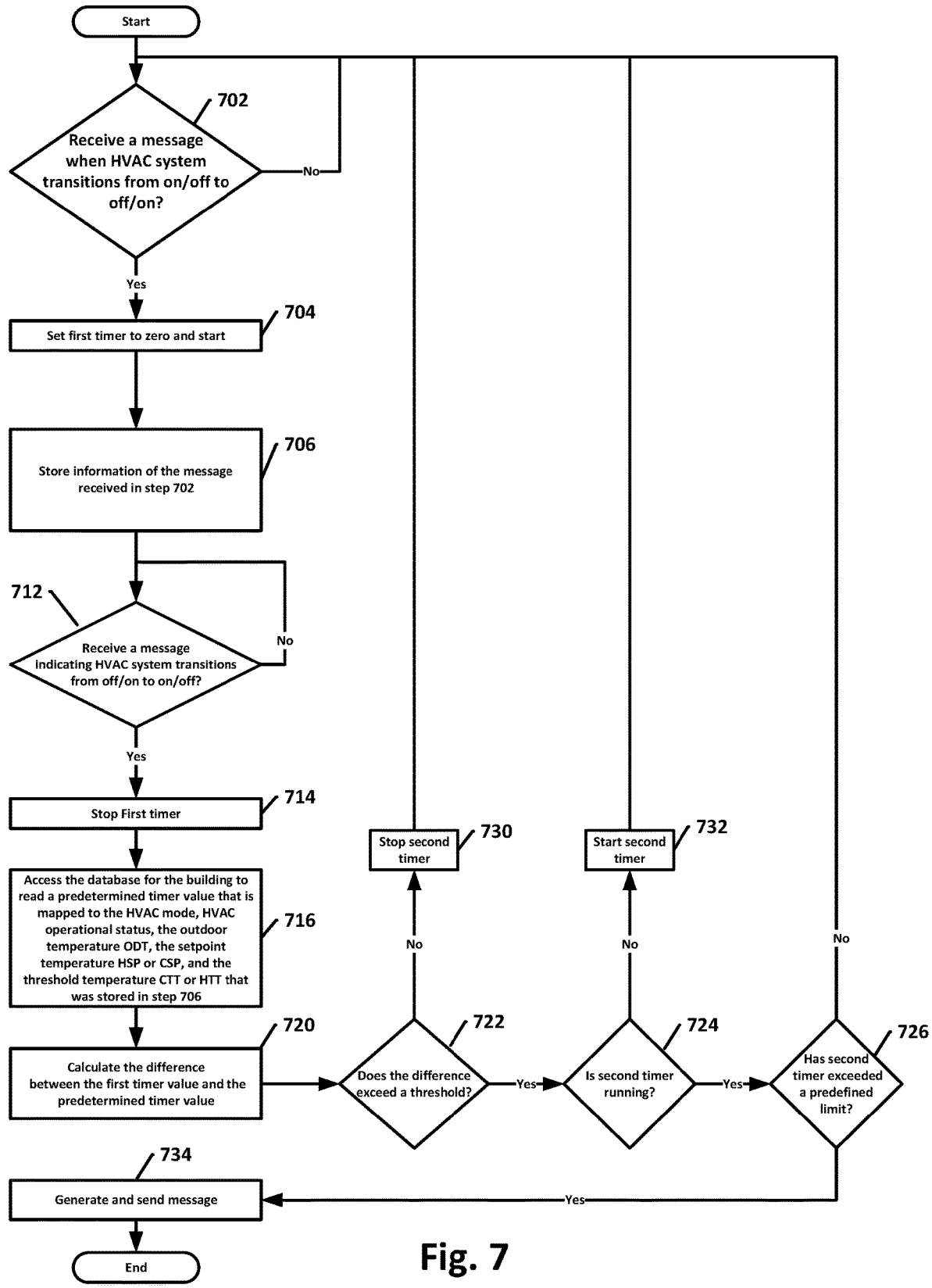
FIG. 7 is a flowchart that illustrates relevant aspects of a method according to another embodiment the present disclosure.

In an alternative embodiment, server 130 can detect an abnormal rate of temperature change in a climate-controlled space by comparing the durations of cooling or heating cycles (i.e. compressor on time) with expected values, or the durations between cooling or heating cycles (i.e. compressor off time) with expected values. FIG. 7 is a flowchart illustrating a method implemented by server 130 that employs this alternative embodiment. In step 702, server 130 receives a message from thermostat 150 when HVAC system 100 transitions from off-to-on or on-to-off. The message may identify the mode and operational status of HVAC system 100, a heating or cooling point temperature HSP or CSP, the cooling or heating threshold temperature CTT or HTT, the direction of the transition (e.g., on-to-off or off-to-on), and/or the outdoor ambient temperature ODT. In step 704, server 130 resets a first timer to zero, and then initiates the first timer. In step 706, server 130 stores information contained in the message received in step 702. Eventually in step 712, server 130 receives another message from thermostat 150 when HVAC system 100 transitions back to its prior state (e.g., off-to-on or on-to-off). When that message is received, server 130 stops the first timer as shown in step 714. Database 402 stores predetermined timer values for thermostat 150. The predetermined timer values were calculated based upon historical data provided by thermostat 150. Each of the predetermined timer values can be mapped in database 402 to respective combinations of outdoor temperature ODT, HVAC system mode (heating or cooling), the operational status of the HVAC system (on or off), the setpoint temperature HSP or CSP, and threshold temperature HTT or CTT. In step 716, server 130 retrieves a predetermined timer from database 402 that is mapped to HSP or CSP, HVAC mode, HVAC operational status, ODT, and CTT or HTT, which were stored in step 706. In an alternative embodiment, server 130 can calculate the predetermined timer value by processing HSP or CSP, HVAC mode, HVAC operational status, ODT, and HTT or CTT using an algorithm uniquely defined for HVAC system 100. In step 720, server 130 determines the difference between the first timer value and the predetermined time value that was retrieved in step 716. If the difference does not exceed a threshold value in step 722, then server 130 stops a second timer if it is running in step 730, and step 702 is repeated. If the difference exceeds the threshold, then server 130 checks to see if the second timer is running in step 724. If the second timer is not running, the second timer is started in step 732, and step 702 is repeated. If the second timer is running, than server 130 checks to see if the second timer exceeds a predefined time limit (e.g. two hours). If it has not, step 702 is repeated. If, however, the second timer exceeds the predefined time limit in step 726, server 130 generates and sends a message in step 734. This message could be the same or similar message that was described with reference to step 436 and FIG. 3.

Figure 8:
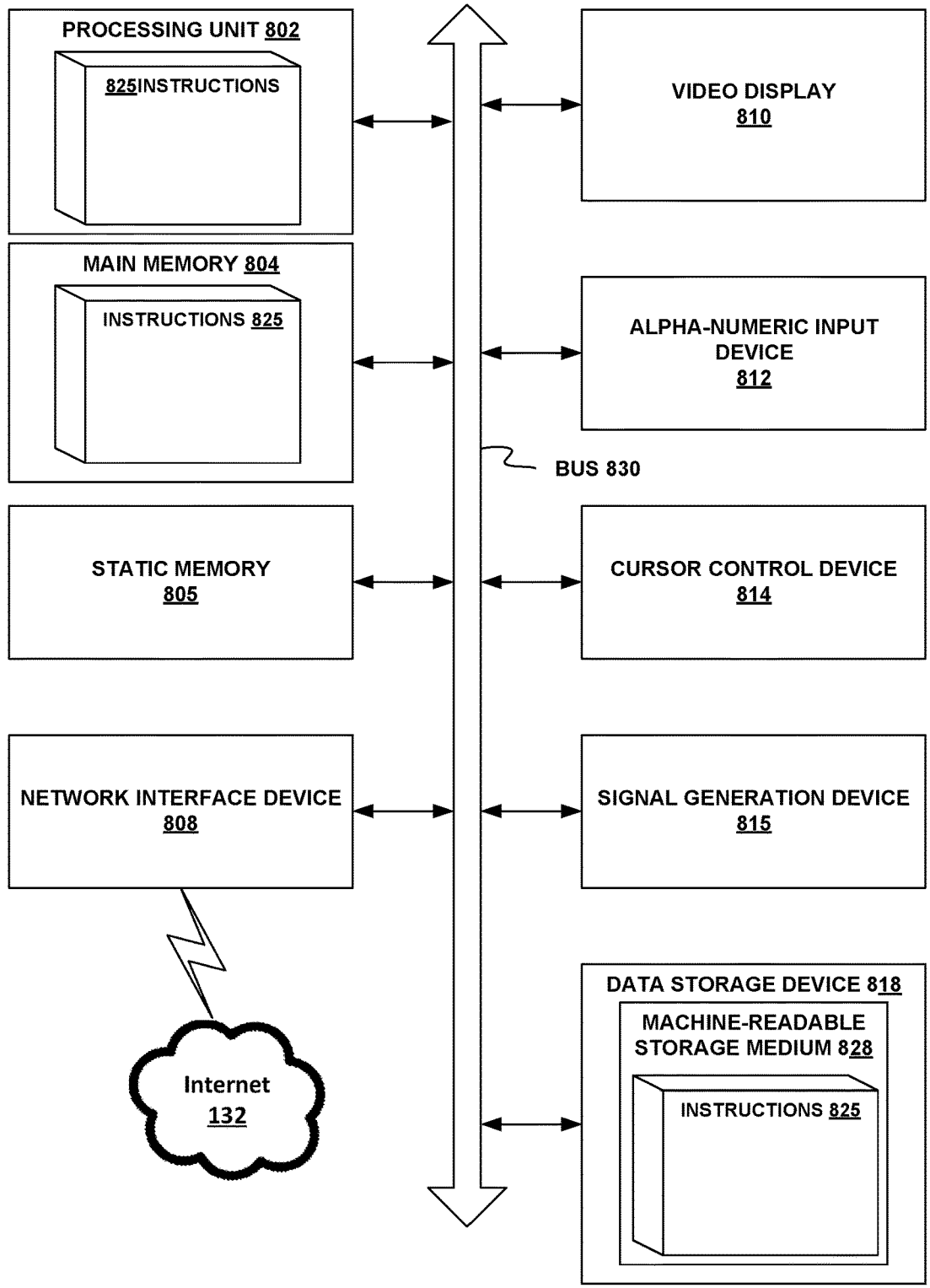
FIG. 8 is a block diagram of an example data processing device that may perform one or more of the operations described herein, in accordance with some embodiments.

FIG. 8 is a block diagram of an example data processing device (e.g., server) 130 that may perform one or more of the operations described herein, in accordance with some embodiments. Data processing device 130 may be connected to other data processing devices in a LAN, an intranet, an extranet, and/or the Internet. The data processing device may operate in the capacity of a server machine in the client-server network environment or in the capacity of a client in a peer-to-peer network environment. The data processing device may be provided by a personal computer (PC), a set-top box (STB), a server, a network router, switch or bridge, or any machine capable of executing a set of instructions (sequential or otherwise) that specify actions to be taken by that machine. Further, while only a single data processing device is illustrated, the term "data processing device" shall also be taken to include any collection of data processing devices that individually or jointly execute a set (or multiple sets) of instructions to perform the methods discussed herein.

The example data processing device 130 may include a processing unit (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing unit 802 may be provided by one or more general-purpose processing devices such as a microprocessor, central processing unit, or the like. In an illustrative example, processing unit 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing unit 802 may also comprise one or more special-purpose processing devices such as an application specific integrated circuit (ASIC), a field programmable gate array (FPGA), a digital signal processor (DSP), network processor, or the like. The processing unit 802 may be configured to execute the operations described herein, in accordance with one or more aspects of the present disclosure, for performing the operations and steps discussed herein.

Data processing device 130 may further include a network interface device 808 which may communicate with Internet 132. The data processing device 130 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for carrying out the operations described herein, in accordance with one or more aspects of the present disclosure. Instructions 825 may also reside, completely or at least partially, within main memory 804 and/or within processing unit 802 during execution thereof by data processing device 800, main memory 804 and processing unit 802 also constituting computer-readable media. The instructions 825 may further be transmitted or received over Internet 132 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Clause 1. A method comprising: receiving first and second indoor temperature values that represent ambient temperature of a first climate-controlled space of a building at different times; receiving an outdoor temperature value that represents ambient temperature of an environment external to the building; calculating a first temperature gradient value based on the first and second indoor temperature values; selecting a first expected temperature gradient value from a plurality of expected temperature gradient values stored in memory using the outdoor temperature value; determining a difference between the first temperature gradient value and the first expected temperature gradient value; generating a first signal if the difference between the first temperature gradient value and the first expected temperature gradient value exceeds a predetermined threshold value Clause 2. The method of the preceding clause further comprising: receiving a first plurality of indoor temperature values, including the first and second indoor temperature values, representing the ambient temperature of the first climate-controlled space at respective points in time; calculating a first plurality of temperature gradient values, including the first temperature gradient value, based on the first plurality of indoor temperature values; determining a difference between each of the first plurality of temperature gradient values, including the first temperature gradient value, and the first expected temperature gradient value; generating the first signal if the difference between each of the first plurality of temperature gradient values, including the first temperature gradient value, and the first expected temperature gradient value exceeds the predetermined threshold value.

Clause 3. The method of any of the preceding clauses further comprising: receiving first data indicating a climate control system, which controls the ambient temperature of the first climate-controlled space, operates in a first state; wherein the first plurality of indoor temperature values are received while the climate control system operates in the first state; wherein the first expected temperature gradient value is selected from the plurality of expected temperature gradient values using the first data.

Clause 4. The method of any of the preceding clauses further comprising: receiving a second plurality of indoor temperature values for the first climate-controlled space while the climate control system operates in the first state, wherein the second plurality of indoor temperature values represents the ambient temperature of the first climate-controlled space at respective points in time; calculating a second plurality of second temperature gradient values based on the second plurality of indoor temperature values; selecting a second expected temperature gradient value from the plurality of expected temperature gradient values using the outdoor temperature value and at least one of the second plurality of indoor temperature values; determining a difference between each of the second plurality of temperature gradient values and the second expected temperature gradient value; generating the first signal if the difference between each of the second plurality of temperature gradient values and the second expected temperature gradient value exceeds the predetermined threshold value.

Clause 5 The method of any of the preceding clauses further comprising: receiving second data indicating the climate control system component is operating in a second state; receiving a third plurality of indoor temperature values while the climate control system operates in the second state, wherein the third plurality of indoor temperature values represent the temperature of the first climate-controlled space at respective times; calculating a third plurality of temperature gradient values based on the third indoor temperature values; selecting a third expected temperature gradient value from the plurality of expected temperature gradient values using the second data; determining a difference between each of the third plurality of temperature gradient values and the second expected temperature gradient value; generating the first signal if the difference between each of the third plurality of temperature gradient values and the second expected temperature gradient value exceeds the predetermined threshold value.

Clause 6. The method of any of the preceding clauses further comprising: receiving second data indicating the climate control system operates in a first mode; wherein the first plurality of indoor temperature values are received while the climate control system operates in the first mode; wherein the first expected temperature gradient value is selected from the plurality of expected temperature gradient values using the first and second data.

Clause 7. The method of any of the preceding clauses further comprising: receiving third and fourth indoor temperature values that represent ambient temperature at different times of a second climate-controlled space of a second building; calculating a second temperature gradient value based on the third and fourth indoor temperature values; selecting a second expected temperature gradient value from the plurality of expected temperature gradient values stored in memory using the outdoor temperature value; determining a difference between the second temperature gradient value and the second expected temperature gradient value; generating a second signal if the difference between the second temperature gradient value and the second expected temperature gradient value exceeds the predetermined threshold value.

Clause 8. The method of any of the preceding clauses further comprising activating or deactivating an electric motor in response to the generation of the first signal; wherein the electric motor is contained inside the building.

Clause 9. A non-transitory memory that stores executable instructions, wherein a data processing system implements a method in response to executing the instructions, the method comprising: receiving first and second indoor temperature values that represent ambient temperature at different times of a first climate-controlled space of a building; receiving an outdoor temperature value that represents ambient temperature of an environment external to the building; calculating a first temperature gradient value based on the first and second indoor temperature values; selecting a first expected temperature gradient value from a plurality of expected temperature gradient values stored in a database using the outdoor temperature value; determining a difference between the first temperature gradient value and the first expected temperature gradient value; generating a first signal if the difference between the first temperature gradient value and the first expected temperature gradient value exceeds a predetermined threshold value.

Clause 10. The non-transitory memory of the preceding clause wherein the method further comprises: receiving a first plurality of indoor temperature values, including the first and second indoor temperature values, representing the ambient temperature of the first climate-controlled space at respective points in time; calculating a first plurality of temperature gradient values, including the first temperature gradient value, based on the first plurality of indoor temperature values; determining a difference between each of the first plurality of temperature gradient values, including the first temperature gradient value, and the first expected temperature gradient value; generating the first signal if the difference between each of the first plurality of temperature gradient values, including the first temperature gradient value, and the first expected temperature gradient value exceeds a predetermined threshold value.

Clause 11. The non-transitory memory of any of the preceding clauses wherein the method further comprises: receiving first data indicating a climate control system, which controls the ambient temperature of the first climate-controlled space, is operating in a first state; wherein the first plurality of indoor temperature values are received while the climate control system operates in the first state; wherein the first expected temperature gradient value is selected from the plurality of expected temperature gradient values using the first data.

Clause 12. The non-transitory memory of any of the preceding clauses wherein the method further comprises: receiving a second plurality of indoor temperature values for the first climate-controlled space while the climate control system operates in the first state, wherein the second plurality of indoor temperature values represents the ambient temperature of the first climate-controlled space at respective points in time; calculating a second plurality of second temperature gradient values based on the second plurality of indoor temperature values; selecting a second expected temperature gradient value from the plurality of expected temperature gradient values using the outdoor temperature value and at least one of the second plurality of indoor temperature values; determining a difference between each of the second plurality of temperature gradient values and the second expected temperature gradient value; generating the first signal if the difference between each of the second plurality of temperature gradient values and the second expected temperature gradient value exceeds the predetermined threshold value.

Clause 13. The non-transitory memory of any of the preceding clauses wherein the method further comprises: receiving second data indicating the climate control system is operating in a second state; receiving a third plurality of indoor temperature values while the climate control system operates in the second state, wherein the third plurality of indoor temperature values represent the ambient temperature of the first climate-controlled space at respective times; calculating a third plurality of temperature gradient values based on the third indoor temperature values; selecting a third expected temperature gradient value from the plurality of expected temperature gradient values using the second data; determining a difference between each of the third plurality of temperature gradient values and the second expected temperature gradient value; generating the first signal if the difference between each of the third plurality of temperature gradient values and the second expected temperature gradient value exceeds the predetermined threshold value.

Clause 14. The non-transitory memory of any of the preceding clauses wherein the method further comprises: receiving third and fourth indoor temperature values that represent ambient temperature at different times of a second climate-controlled space of a second building; calculating a second temperature gradient value based on the third and fourth indoor temperature values; selecting a second expected temperature gradient value from the plurality of expected temperature gradient values stored in the database using the outdoor temperature value; determining a difference between the second temperature gradient value and the second expected temperature gradient value; generating a second signal if the difference between the second temperature gradient value and the second expected temperature gradient value exceeds the predetermined threshold value.

Clause 15. The non-transitory memory of any of the preceding clauses wherein the method further comprises activating or deactivating an electric motor in response to the generation of the first signal; wherein the electric motor is contained inside the building.

Clause 16. An apparatus comprising: a memory comprising instructions; a central processing unit configured to implement a method in response to executing the instructions, the method comprising: receiving first and second indoor temperature values that represent ambient temperature at different times of a first climate-controlled space of a building; receiving an outdoor temperature value that represents ambient temperature of an environment external to the building; calculating a first temperature gradient value based on the first and second indoor temperature values; selecting a first expected temperature gradient value from a plurality of expected temperature gradient values stored in a database using the outdoor temperature value; determining a difference between the first temperature gradient value and the first expected temperature gradient value; generating a first signal if the difference between the first temperature gradient value and the first expected temperature gradient value exceeds a predetermined threshold value.

Clause 17. The apparatus of the preceding clause wherein the method further comprises: receiving a first plurality of indoor temperature values, including the first and second indoor temperature values, representing the ambient temperature of the first climate-controlled space at respective points in time; calculating a first plurality of temperature gradient values, including the first temperature gradient value, based on the first plurality of indoor temperature values; determining a difference between each of the first plurality of temperature gradient values, including the first temperature gradient value, and the first expected temperature gradient value; generating the first signal if the difference between each of the first plurality of temperature gradient values, including the first temperature gradient value, and the first expected temperature gradient value exceeds the predetermined threshold value.

Clause 18. The apparatus of any of the preceding clauses wherein the method further comprises: receiving first data indicating a climate control system, which controls the ambient temperature of the first climate-controlled space, is operating in a first state; wherein the first plurality of indoor temperature values are received while the climate control system operates in the first state; wherein the first expected temperature gradient value is selected from the plurality of expected temperature gradient values using the first data.

Clause 19. The apparatus of any of the preceding clauses wherein the method further comprises: receiving a second plurality of indoor temperature values for the first climate-controlled space while the climate control system operates in the first state, wherein the second plurality of indoor temperature values represents the ambient temperature of the first climate-controlled space at respective points in time; calculating a second plurality of second temperature gradient values based on the second plurality of indoor temperature values; selecting a second expected temperature gradient value from the plurality of expected temperature gradient values using the outdoor temperature value and at least one of the second plurality of indoor temperature values; determining a difference between each of the second plurality of temperature gradient values and the second expected temperature gradient value; generating the first signal if the difference between each of the second plurality of temperature gradient values and the second expected temperature gradient value exceeds the predetermined threshold value.

Clause 20. The apparatus of any of the preceding clauses wherein the method further comprises: receiving second data indicating the climate control system is operating in a second state; receiving a third plurality of indoor temperature values while the climate control system operates in the second state, wherein the third plurality of indoor temperature values represent the ambient temperature of the first climate-controlled space at respective times; calculating a third plurality of temperature gradient values based on the third indoor temperature values; selecting a third expected temperature gradient value from the plurality of expected temperature gradient values using the second data; determining a difference between each of the third plurality of temperature gradient values and the second expected temperature gradient value; generating the first signal if the difference between each of the third plurality of temperature gradient values and the second expected temperature gradient value exceeds the predetermined threshold value.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method comprising:
    receiving first and second indoor temperature values that represent ambient temperature of a first climate-controlled space of a building at different times;
    receiving an outdoor temperature value that represents ambient temperature of an environment external to the building;
    calculating a first temperature gradient value based on the first and second indoor temperature values;
    selecting a first expected temperature gradient value from a plurality of expected temperature gradient values stored in a memory using the outdoor temperature value;
    determining a difference between the first temperature gradient value and the first expected temperature gradient value;
    generating a first signal in response to the difference between the first temperature gradient value and the first expected temperature gradient value exceeding a predetermined threshold value; and
    transmitting the first signal to a motor controller, wherein the motor controller receives the first signal and activates an electric motor to interrupt a source of unwanted heating or cooling to decrease the difference between the first temperature gradient value and the first expected temperature gradient value.

2. The method of claim 1 further comprising:
    receiving a first plurality of indoor temperature values, including the first and second indoor temperature values, representing the ambient temperature of the first climate-controlled space at respective points in time;
    calculating a first plurality of temperature gradient values, including the first temperature gradient value, based on the first plurality of indoor temperature values;
    determining a difference between each of the first plurality of temperature gradient values, including the first temperature gradient value, and the first expected temperature gradient value; and
    generating the first signal in response to the difference between each of the first plurality of temperature gradient values, including the first temperature gradient value, and the first expected temperature gradient value exceeding the predetermined threshold value.

3. The method of claim 2 further comprising:
    receiving first data indicating a climate control system, which controls the ambient temperature of the first climate-controlled space, operates in a first state;
    wherein the first plurality of indoor temperature values are received while the climate control system operates in the first state; and wherein the first expected temperature gradient value is selected from the plurality of expected temperature gradient values using the first data.

4. The method of claim 3 further comprising:
receiving a second plurality of indoor temperature values for the first climate-controlled space while the climate control system operates in the first state, wherein the second plurality of indoor temperature values represents the ambient temperature of the first climate-controlled space at respective points in time;
calculating a second plurality of temperature gradient values based on the second plurality of indoor temperature values;
selecting a second expected temperature gradient value from the plurality of expected temperature gradient values using the outdoor temperature value and at least one of the second plurality of indoor temperature values;
determining a difference between each of the second plurality of temperature gradient values and the second expected temperature gradient value; and
generating the first signal in response to the difference between each of the second plurality of temperature gradient values and the second expected temperature gradient value exceeding the predetermined threshold value.

5. The method of claim 3 further comprising:
receiving second data indicating the climate control system operates in a first mode;
wherein the first plurality of indoor temperature values are received while the climate control system operates in the first mode; and
wherein the first expected temperature gradient value is selected from the plurality of expected temperature gradient values using the first and second data.

6. The method of claim 1 further comprising:
receiving second data indicating a climate control system is operating in a second state;
receiving a third plurality of indoor temperature values while the climate control system operates in the second state, wherein the third plurality of indoor temperature values represent the temperature of the first climate-controlled space at respective times;
calculating a third plurality of temperature gradient values based on the third plurality of indoor temperature values;
selecting a third expected temperature gradient value from the plurality of expected temperature gradient values using the second data;
determining a difference between each of the third plurality of temperature gradient values and the third expected temperature gradient value; and
generating the first signal in response to the difference between each of the third plurality of temperature gradient values and the third expected temperature gradient value exceeding the predetermined threshold value.

7. The method of claim 1 further comprising:
receiving third and fourth indoor temperature values that represent ambient temperature at different times of a second climate-controlled space of a second building;
calculating a second temperature gradient value based on the third and fourth indoor temperature values;
selecting a second expected temperature gradient value from the plurality of expected temperature gradient values stored in a memory using the outdoor temperature value;
determining a difference between the second temperature gradient value and the second expected temperature gradient value; and
generating a second signal in response to the difference between the second temperature gradient value and the second expected temperature gradient value exceeding the predetermined threshold value.

8. The method of claim 1 wherein the electric motor is contained inside the building.

9. A non-transitory memory that stores executable instructions, wherein a data processing system implements a method in response to executing the instructions, the method comprising:
receiving first and second indoor temperature values that represent ambient temperature at different times of a first climate-controlled space of a building;
receiving an outdoor temperature value that represents ambient temperature of an environment external to the building;
calculating a first temperature gradient value based on the first and second indoor temperature values;
selecting a first expected temperature gradient value from a plurality of expected temperature gradient values stored in a database using the outdoor temperature value;
determining a difference between the first temperature gradient value and the first expected temperature gradient value;
generating a first signal in response to the difference between the first temperature gradient value and the first expected temperature gradient value exceeding a predetermined threshold value; and
transmitting the first signal to a motor controller, wherein the motor controller receives the first signal and activates an electric motor to interrupt a source of unwanted heating or cooling to decrease the difference between the first temperature gradient value and the first expected temperature gradient value.

10. The non-transitory memory of claim 9 wherein the method further comprises:
receiving a first plurality of indoor temperature values, including the first and second indoor temperature values, representing the ambient temperature of the first climate-controlled space at respective points in time;
calculating a first plurality of temperature gradient values, including the first temperature gradient value, based on the first plurality of indoor temperature values;
determining a difference between each of the first plurality of temperature gradient values, including the first temperature gradient value, and the first expected temperature gradient value; and
generating the first signal in response to the difference between each of the first plurality of temperature gradient values, including the first temperature gradient value, and the first expected temperature gradient value exceeding a predetermined threshold value.

11. The non-transitory memory of claim 10 wherein the method further comprises:
receiving first data indicating a climate control system, which controls the ambient temperature of the first climate-controlled space, is operating in a first state;
wherein the first plurality of indoor temperature values are received while the climate control system operates in the first state; and wherein the first expected temperature gradient value is selected from the plurality of expected temperature gradient values using the first data.

12. The non-transitory memory of claim 11 wherein the method further comprises:
   receiving a second plurality of indoor temperature values for the first climate-controlled space while the climate control system operates in the first state, wherein the second plurality of indoor temperature values represents the ambient temperature of the first climate-controlled space at respective points in time;
   calculating a second plurality of temperature gradient values based on the second plurality of indoor temperature values;
   selecting a second expected temperature gradient value from the plurality of expected temperature gradient values using the outdoor temperature value and at least one of the second plurality of indoor temperature values;
   determining a difference between each of the second plurality of temperature gradient values and the second expected temperature gradient value; and
   generating the first signal in response to the difference between each of the second plurality of temperature gradient values and the second expected temperature gradient value exceeding the predetermined threshold value.

13. The non-transitory memory of claim 9 wherein the method further comprises:
   receiving second data indicating a climate control system is operating in a second state;
   receiving a third plurality of indoor temperature values while the climate control system operates in the second state, wherein the third plurality of indoor temperature values represent the ambient temperature of the first climate-controlled space at respective times;
   calculating a third plurality of temperature gradient values based on the third plurality of indoor temperature values;
   selecting a third expected temperature gradient value from the plurality of expected temperature gradient values using the second data;
   determining a difference between each of the third plurality of temperature gradient values and the third expected temperature gradient value; and
   generating the first signal in response to the difference between each of the third plurality of temperature gradient values and the third expected temperature gradient value exceeding the predetermined threshold value.

14. The non-transitory memory of claim 9 wherein the method further comprises:
   receiving third and fourth indoor temperature values that represent ambient temperature at different times of a second climate-controlled space of a second building;
   calculating a second temperature gradient value based on the third and fourth indoor temperature values;
   selecting a second expected temperature gradient value from the plurality of expected temperature gradient values stored in the database using the outdoor temperature value;
   determining a difference between the second temperature gradient value and the second expected temperature gradient value; and
   generating a second signal in response to the difference between the second temperature gradient value and the second expected temperature gradient value exceeding the predetermined threshold value.

15. The non-transitory memory of claim 9 wherein the electric motor is contained inside the building.

16. An apparatus comprising:
   a memory comprising instructions;
   a central processing unit configured to implement a method in response to executing the instructions, the method comprising:
   receiving first and second indoor temperature values that represent ambient temperature at different times of a first climate-controlled space of a building; and
   receiving an outdoor temperature value that represents ambient temperature of an environment external to the building;
   calculating a first temperature gradient value based on the first and second indoor temperature values;
   selecting a first expected temperature gradient value from a plurality of expected temperature gradient values stored in a database using the outdoor temperature value;
   determining a difference between the first temperature gradient value and the first expected temperature gradient value; and
   generating a first signal in response to the difference between the first temperature gradient value and the first expected temperature gradient value exceeding a predetermined threshold value; and
   transmitting the first signal to a motor controller, wherein the motor controller receives the first signal and activates an electric motor to interrupt a source of unwanted heating or cooling to decrease the difference between the first temperature gradient value and the first expected temperature gradient value.

17. The apparatus of claim 16 wherein the method further comprises:
   receiving a first plurality of indoor temperature values, including the first and second indoor temperature values, representing the ambient temperature of the first climate-controlled space at respective points in time;
   calculating a first plurality of temperature gradient values, including the first temperature gradient value, based on the first plurality of indoor temperature values;
   determining a difference between each of the first plurality of temperature gradient values, including the first temperature gradient value, and the first expected temperature gradient value; and
   generating the first signal in response to the difference between each of the first plurality of temperature gradient values, including the first temperature gradient value, and the first expected temperature gradient value exceeding the predetermined threshold value.

18. The apparatus of claim 17 wherein the method further comprises:
   receiving first data indicating a climate control system, which controls the ambient temperature of the first climate-controlled space, is operating in a first state;
   wherein the first plurality of indoor temperature values are received while the climate control system operates in the first state; and
   wherein the first expected temperature gradient value is selected from the plurality of expected temperature gradient values using the first data.

19. The apparatus of claim 18 wherein the method further comprises:

receiving a second plurality of indoor temperature values for the first climate-controlled space while the climate control system operates in the first state, wherein the second plurality of indoor temperature values represents the ambient temperature of the first climate-controlled space at respective points in time;

calculating a second plurality of temperature gradient values based on the second plurality of indoor temperature values;

selecting a second expected temperature gradient value from the plurality of expected temperature gradient values using the outdoor temperature value and at least one of the second plurality of indoor temperature values;

determining a difference between each of the second plurality of temperature gradient values and the second expected temperature gradient value; and generating the first signal in response to the difference between each of the second plurality of temperature gradient values and the second expected temperature gradient value exceeding the predetermined threshold value.

20. The apparatus of claim 16 wherein the method further comprises:

receiving second data indicating a climate control system is operating in a second state;

receiving a third plurality of indoor temperature values while the climate control system operates in the second state, wherein the third plurality of indoor temperature values represent the ambient temperature of the first climate-controlled space at respective times;

calculating a third plurality of temperature gradient values based on the third plurality of indoor temperature values;

selecting a third expected temperature gradient value from the plurality of expected temperature gradient values using the second data;

determining a difference between each of the third plurality of temperature gradient values and the third expected temperature gradient value; and generating the first signal in response to the difference between each of the third plurality of temperature gradient values and the third expected temperature gradient value exceeding the predetermined threshold value.

* * * * *